United States Patent [19]

Aivasidis et al.

[11] Patent Number: 4,670,140
[45] Date of Patent: Jun. 2, 1987

[54] FIXED BED REACTOR COLUMN FOR ANAEROBIC DECOMPOSITION PROCESSES

[75] Inventors: Alexander Aivasidis, Jülich; Christian Wandrey, Jülich-Stetternich; Rainer Pick, Eschfeld, all of Fed. Rep. of Germany

[73] Assignee: Kernforschungsanlage Jülich Gesellschaft mit beschränkter Haftung, Düren, Fed. Rep. of Germany

[21] Appl. No.: 837,081

[22] Filed: Mar. 6, 1986

[30] Foreign Application Priority Data

Mar. 8, 1985 [DE] Fed. Rep. of Germany ....... 3508274

[51] Int. Cl.[4] .......................... C12M 1/02; C02F 3/28
[52] U.S. Cl. ..................................... 210/188; 210/284; 422/193; 435/310; 435/819
[58] Field of Search .............. 210/603, 617, 180, 150, 210/151, 189, 261, 266, 284, 289, 291, 292, 188; 435/290, 310, 316, 819; 48/111; 422/193

[56] References Cited

U.S. PATENT DOCUMENTS 2,992,980 7/1961 Ingram .......................... 210/617 X
4,166,791 9/1979 Morvin .......................... 210/180 X
4,248,972 2/1981 Fischer .......................... 210/180 X
4,421,534 12/1983 Walker .......................... 210/617 X

FOREIGN PATENT DOCUMENTS 0012476 8/1982 European Pat. Off. .
3326879 7/1983 Fed. Rep. of Germany .

Primary Examiner—Tom Wyse
Attorney, Agent, or Firm—Nils H. Ljungman

[57] ABSTRACT

A fixed bed layer of a reactor column for the execution of anaerobic decomposition processes, which column is divided by screen partitions into segments one above another with intermediate spaces for gas discharge from the column through discharge funnels into one or more corresponding, ascending pipes. Additional devices for the introduction of liquid or gas into the individual fixed bed segments produce turbulence and remove excess sludge from the fixed bed layer. Annular guide elements project from the inner wall of the column underneath the funnel and have a constricted cross section which defines an annular channel to the next column segment. Thus, a liquid stream is not blocked during optimal gas collection in the funnel. The funnels are preferably installed in the screen floor of the subsequent column segment.

18 Claims, 3 Drawing Figures

FIXED BED REACTOR COLUMN FOR ANAEROBIC DECOMPOSITION PROCESSES

BACKGROUND OF THE INVENTION

1. Field of the Invention:

The invention relates to a reactor column for the implementation of anaerobic decomposition processes with a fixed bed, through which the reaction fluid travels upward.

2. Description of the Prior Art:

The execution of anaerobic decomposition processes on carrier-fixed microorganisms is increasing in importance. The anaerobic purification of waste water appears particularly beneficial. In this process, in contrast to the activated sludge process, relatively small amounts of residual sludge are formed and the energy balance of the entire process is more favorable, since on the one hand, there is no need to introduce oxygen, and on the other hand, the biogas formed can be used as an energy source.

A prerequisite for a commercial application of the process is high efficiency per unit of volume and per unit of time, that is, for a given reactor volume, the maximum quantity of waste water substrate must be treated in the shortest possible time.

Recently, therefore, processes have been developed for the immobilization of active biomasses which make it possible to deal with quantities of waste water like those treated commercially in an acceptable length of time using reactors of an acceptable size. But a problem which occurs with the use of beds of small-particle carrier materials, for example, with a size of 5 to 15 mm, which exhibit a surface large enough for cell fixation, is that excessive sludge is formed after a period of extended operation, which leads to clogging and limitations of diffusion, and to the formation of graft flows. In addition, the amount of biogas contained in the reaction mixture increases as the reaction proceeds, which has an adverse effect on the treatment system (solid/liquid/gas).

For these reasons, reactor columns with small-particle carriers, with fixed beds more than approximately 2 meters in height, are no longer considered optimal.

A reduction of the specific activity of the column, in order to prevent the increasing clogging of the fixed bed, or a corresponding limitation of the height of the reactor, does not appear very economical, since on the one hand, the overall reactors would have to be larger, and on the other hand, the ground space required for a "flat" design with the appropriate column cross section, or a number of parallel columns, would not be economical.

OBJECTS OF THE INVENTION

It is therefore an object of the invention to provide a reactor column design adapted to the requirements of actual practical applications, by means of which high specific activities of the biocatalyst can be allowed and successful operation is possible over long periods.

It is a further object of the invention to provide a high-rise design for a reactor column which can be constructed requiring only a limited amount of ground space.

SUMMARY OF THE INVENTION

The invention achieves these objectives, in that the fixed bed is divided by screen floors into sections arranged one on top of another, with spaces in between, in which there are gas discharge lines and gas and/or liquid inlets below the screens, generally in the shape of (inverted) funnels, leading to one or more ascending pipes outside the column.

The improved reactor column of this invention for the performance of anaerobic decomposition processes by means of a fixed bed layer through which reactional liquid flow upwardly comprises a jacket means which defines the reactor column. Within the reactor means are at least two individual fixed bed reactor segments or individual reaction zones which are disposed one above the other in a stacked relationship. Each of the individual fixed bed reactor segments includes a screen-like floor means upon which is disposed a fixed bed layer of a predetermined height. There is also defined, above each fixed bed layer, a void in each of the individual segments. A gas discharge means includes means generally in the shape of an inverted funnel disposed in the void above each fixed bed layer. The inverted funnel means is in communication with at least one ascending gas discharge pipe which is mounted external to the jacket means. This communication can be established by means of a transition pipe which is disposed upwardly and outwardly toward the jacket wall with respect to the inverted funnel means. Fluid inlet means are disposed underneath each of the screen-like floor means of each of the individual segments. Additionally, a star-shaped feed distributor means for the introduction of the reaction liquid into the reaction column is disposed on the column floor just below the screen-like floor which defines the bottom-most segment of the reactor column. A liquid extraction means is disposed at the upper end of the fixed bed reactor in the void defined above the upper-most fixed bed reactor segment. The liquid extraction means is in the form of a closed tube with upper feed holes.

BRIEF DESCRIPTION OF THE DRAWINGS

The above, as well as other features and advantages of the present invention, can be appreciated through consideration of the detailed description of the invention in conjunction with the several drawings in which.

DESCRIPTION OF THE PREFERRED EMBODIMENT

Figure 1:
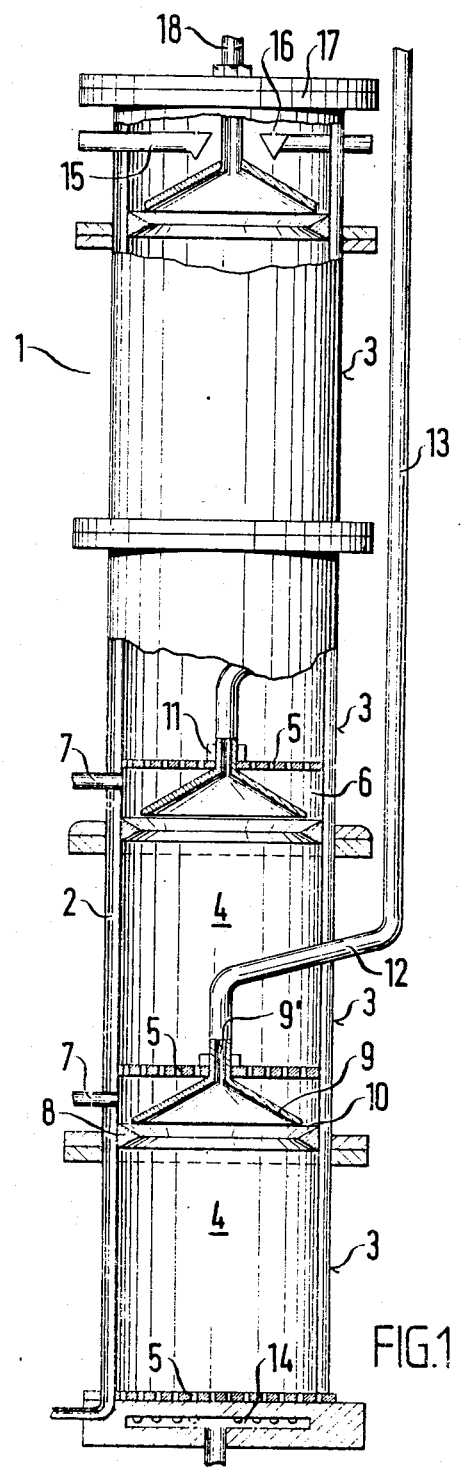
FIG. 1 is a schematic elevational view of the improved reactor column incorporating the features of this invention.
Figure 2:
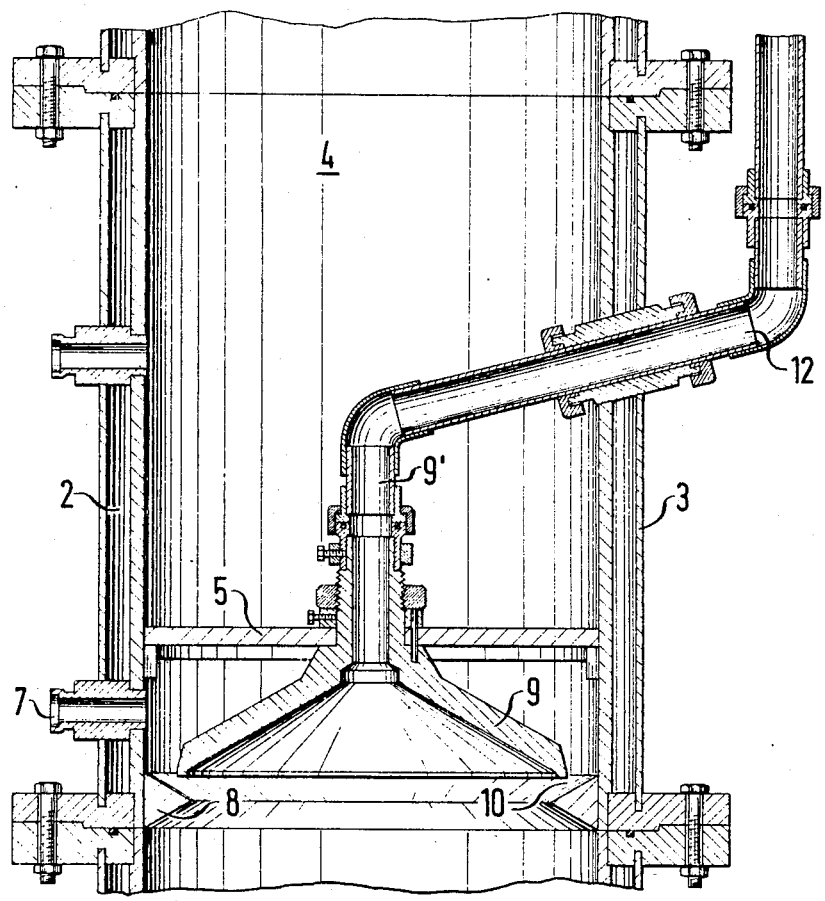
FIG. 2 is a cross-sectional detailed view of a section of the reactor column of this invention illustrating the inverted funnel gas discharge, the screen-like floor and the fixed reactor bed.
Figure 3:
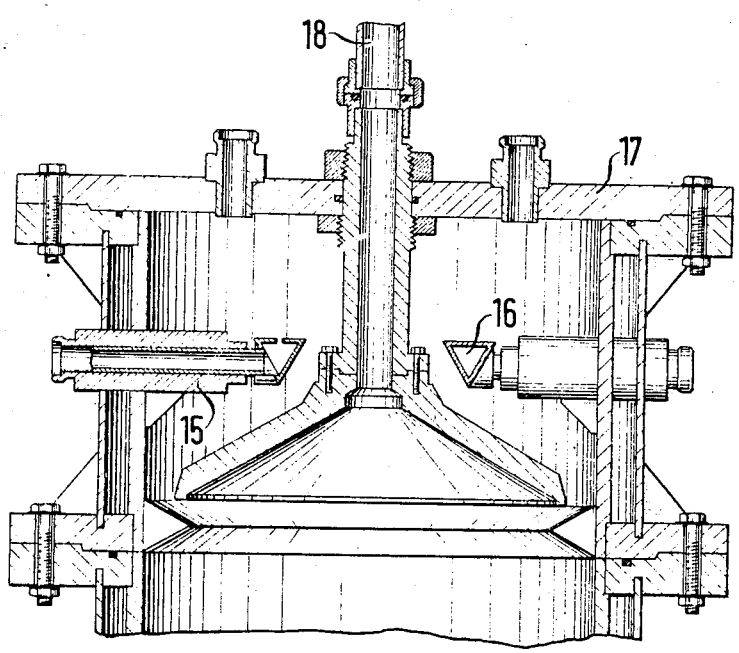
FIG. 3 is a cross-sectional detailed view of the upper-most portion of the reactor column of this invention illustrating the liquid extraction means disposed therein.

The column reactor 1 shown with a thermostat jacket 2 is divided into four segments 3, each of which includes a fixed bed layer 4 on a screen floor 5, and a space 6 which leads into the side tubes 7.

In the space 6, above an annular guide element 8, there is a gas discharge funnel 9, which forms an "annular gap" 10 together with the annular guide element 8. This annular gap 10 can be adjusted by adjusting the height of the funnel 9 by means of one or more adjustment screws 11. From a funnel tube 9', a connecting tube 12 leads upward and outward through the fixed bed layer 4 to an ascending pipe 13, which reaches at least the height of the liquid discharge via the annular extraction tube 15 from the column reactor and leads to a gas collecting chamber (not shown).

All of the segments can empty into this ascending pipe 13, or there can also be separate ascending pipes which lead to the gas collection chamber.

The reaction liquid travels through a star-shaped distributor 14 on the screen floor 5 of the column reactor, is distributed over the cross-section into the fixed bed, and converted liquid is extra via an annular extraction tube 15 with outlet tubes from the reactor column. This annular extraction tube 15, in its upward-pointing surface, has holes 16, by means of which the liquid is extracted from the reactor. A triangular cross-section of the extraction tube, with the point downward, is appropriate.

The gas discharge funnel 9 of the final column segment is no longer in the screen floor, but is installed in the column cover 17, and its funnel tube 18 leads directly to the gas collection chamber.

The column packing can be formed by carrier particles of the prior art with microorganisms immobilized on them, or by granular materials, etc., charged with biomasses. The individual segments can also exhibit additional pipes for probes, sampling, control liquids, etc.

To remove excess sludge, flushing liquids can be forced through the column segments during a pause in operations, for example, via the lower fluid distributor 14 and the side tubes or lateral pipes 7. In this case, the funnel 9 is appropriately placed in its highest position.

With such a reactor column divided into fixed bed segments located above one another with spaces in between, an effective and long-term operation can be achieved, since excess sludge is discharged, on the one hand, via constant floatation phenomena through the gas lines (and is separated in the sludge separator of the gas collection chamber), and on the other hand, can be expelled in intermediate phases by a flushing medium, which is admitted in the reverse direction via the appropriate inlets beneath the screens.

The spaces between the segments are a function of the distance between the upper end of the fixed bed layer of a segment and the permeable floor or screen of the subsequent section. In this space are the inverted-funnel gas discharge lines which, mounted in the screen, are conducted through the packing of the subsequent segment outward to ascending pipes.

Annular guide elements interact with the inverted-funnel gas discharge lines and project from the circumference into the column, narrowing the cross section, the opening cross section of which is smaller than that of the funnel base, so that the gas bubbles contained in the ascending gas/liquid mixture are introduced into the funnel, while the liquid flows through the "annular gap" between the conductor and the funnel outward and upward to the next segment.

The "annular gap" should thereby have a cross section so that no significant pressure loss occurs at this point. To make possible an optimal adjustment of the free cross section of this "annular gap" to the prevailing conditions, the gas discharge funnel is mounted so that is vertical position inside the space can be adjusted.

The base cross-section of the gas discharge funnel, which interacts with the annular guide element, can essentially be as large as desired, but the funnel cross-section is advantageously one which largely covers the column cross section and still leaves sufficient space for the liquid flow.

The angle of inclination of the funnel cone from the horizontal is optimized within the space, bearing in mind that an excessively flat funnel can result in loss of bubbles, while a funnel with excessively steep sides is inappropriate because of the height limitations of the space. Inclinations between 15° and 60° are appropriate, especially an angle of approximately 35°.

To facilitate the gas discharge from the funnel into the ascending pipe, an ascending connecting tube is selected, one which specifically has an angle of 15° to 30° to the horizontal.

The gas discharge funnel can lead to a separate ascending pipe or into a common ascending pipe. The ascending pipes extend at least to above the upper fluid discharge of the reactor and empty into a gas collecting chamber. The cross section of the gas discharges from the lower segments of the column can, if necessary, be made larger to accommodate a more intensive gas generation in the lower portion of the column than the discharge lines from the higher portions.

The individual segments of the column reactor can be identical to one another, to facilitate their manufacture. However, it may also be appropriate if the height of the segments increases with the height of the reactor column, so that consideration can be given to a decrease in the concentration in the substrate as the reaction proceeds (column height).

In a similar manner, the grain size of the carrier or the diameter of the carrier particles can be graduated from bottom to top, whereby the larger particles, for example, 30 to 50 mm in diameter, are in the lower region and the finer particles, for example, down to 15 to 9 mm in diameter, are in the upper region.

The lateral inlet tubes below the screens, by means of which a flushing out of the excess sludge is achieved, offer additional possibilities of process control by means of the addition of substrate distributed vertically, partial recycling, or even the addition of reagent.

The addition of the reaction liquid is done as usual at the bottom of the reactor column, specifically by means of a star-shaped liquid distributor, and at the top of the column the reaction liquid is extracted by means of an annular extraction tube, which exhibits holes 4 to 5 mm in diameter pointing upward, by means of which the liquid to be extracted enters into the annular tube.

The bed height of the individual fixed bed segments is appropriately 50 to 200 centimeters, specifically 100 to 160 centimeters, in the case of fixed biocatalysts with an activity of 5–16 kg- $COD/kg \times x \times d$ ($x$=biomass concentration as dry mass), and is also a function of the COD (COD=chemical oxygen demand) of the feed.

The construction of the reactor column described above is suitable for anaerobic processes in the fixed bed with and without recycling of the liquid used.

What has been described is an improved fixed bed reactor column, by means of which high specific activities of the biocatalyst can be allowed and successful operations are possible over long periods.

The invention as described hereinabove in the context of the preferred embodiments is not to be taken as limited to all of the provided details thereof, since modifications and variations thereof may be made without department from the spirit and scope of the invention.

What is claimed is:

1. An improved reactor column for the performance of anaerobic decomposition processes by means of a fixed bed layer through which reaction liquid flows upwardly, comprising:
- a jacket means defining the reactor column and having therein at least two individual fixed bed reactor segments disposed one above the other in a stacked relationship, each of said segments including floor means having means for permitting flow therethrough;
- a fixed bed layer being disposed on each of said floor means;
- a void in each said segment being defined above each fixed bed layer;
- gas discharge means including means for collecting gas disposed in the void above each fixed bed layer, said gas collecting means being in communication with at least one ascending gas discharge pipe;
- fluid inlet means disposed underneath each said means for permitting flow therethrough of each of at least two individual fixed bed reactor segments; and
- fluid extraction means disposed at the uppermost part of said reactor column.

2. An improved reactor column for the performance of anaerobic decomposition processes by means of a fixed bed layer through which reaction liquid flows upwardly, comprising:
- a jacket means defining the reactor column and having therein at least two individual fixed bed reactor segments disposed one above the other in a stacked relationship, each of said segments including a screen-like floor means;
- a fixed bed layer being disposed on each of said screen floor means;
- a void in each said segment being defined above each fixed bed layer;
- gas discharge means including means generally in the shape of an inverted funnel disposed in the void above each fixed bed reactor, said inverted funnel means being in communication with at least one ascending gas discharge pipe external to said jacket means; and
- fluid inlet means disposed underneath each said screen floor means of each of at least two individual fixed bed reactor segments.

3. The improved reactor column according to claim 2 wherein the gas discharge means further includes an annular guide element, said annular guide element and said funnel means defining therebetween an annular gap, said annular guide element projecting from an inside wall of said jacket means, wherein the opening defined by said annular guide element is of a lesser dimension than an open cross-section defined by the funnel means.

4. The improved reactor column according to claim 3 wherein the funnel means is vertically adjustable relative to the annular guide element, and the annular gap defined therebetween is adjustable by means of vertical displacement of the funnel means relative to the annular guide element.

5. The improved reactor column according to claim 4 wherein the funnel means defines an interior cone-like surface configuration with an angle of between about 15° to about 60° relative to the horizontal.

6. The improved reactor column according to claim 5 wherein the fixed bed layer disposed on the screen floor means has a bed height of between about 50 centimeters to about 200 centimeters.

7. The improved reactor column according to claim 6 wherein the at least one ascending gas discharge pipe is parallel to the reactor column and extends upwardly to at least the height of the uppermost fluid discharge means of the reactor.

8. The improved reactor column according to claim 7 wherein the gas discharge means includes transition pipe means by which communication is established between the funnel means and the at least one ascending gas discharge pipe, which transition pipe means is disposed upwardly and outwardly with respect to the funnel means through the fixed bed layer toward the ascending gas discharge pipe at an angle of between about 15° to about 30° relative to the horizontal.

9. The improved reactor column according to claim 8 wherein a liquid extraction means is disposed at the upper end of the fixed bed reactor above the funnel means of the uppermost individual fixed bed reactor segment, which liquid extraction means is in the form of a closed tube with feeder hole means having a diameter of preferably between about 4 millimeters to about 5 millimeters.

10. The improved reactor column according to claim 9 wherein the column reactor includes a star-shaped feed distributor means for the introduction of reaction liquid into the reactor column disposed at the column floor.

11. The improved reactor column according to claim 2 wherein the funnel means defines an interior cone-like surface configuration with an angle of between about 15° to about 60° relative to the horizontal.

12. The improved reactor column according to claim 11 wherein the angle of the cone-like surface is preferably about 35° relative to the horizontal.

13. The improved reactor column according to claim 2 wherein the fixed bed layer disposed on the screen floor means has a bed height of between about 50 centimeters to about 200 centimeters.

14. The improved reactor column according to claim 13 wherein the bed height is preferably between about 100 centimeters to about 160 centimeters.

15. The improved reactor column according to claim 2 wherein the at least one ascending gas discharge pipe is parallel to the reactor column and extends upwardly to at least the height of the uppermost fluid discharge means of the reactor.

16. The improved reactor column according to claim 2 wherein the gas discharge means includes transition pipe means by which communication is established between the funnel means and the at least one ascending gas discharge pipe, which transition pipe means is disposed upwardly and outwardly with respect to the funnel means through the fixed bed layer toward the ascending gas discharge pipe at an angle of between about 15° to about 30° relative to the horizontal.

17. The improved reactor column according to claim 2 wherein a liquid extraction means is disposed at the upper end of the fixed bed reactor above the funnel means of the uppermost individual fixed bed reactor segment, which liquid extraction means is in the form of a closed tube with feeder hole means having a diameter of preferably between about 4 millimeters to about 5 millimeters.

18. The improved reactor column according to claim 2 wherein the column reactor includes a star-shaped feed distributor means for the introduction of reaction liquid into the reactor column disposed at the column floor.

* * * * *